US005193633A

United States Patent [19]

Ezenwa

[11] Patent Number: 5,193,633

[45] Date of Patent: Mar. 16, 1993

[54] MOTORIZED TRANSFER AND TRANSPORT SYSTEM FOR THE DISABLED

[75] Inventor: Bertram N. Ezenwa, Centerville, Ohio

[73] Assignee: Wright State University, Dayton, Ohio

[21] Appl. No.: 712,266

[22] Filed: Jun. 7, 1991

[51] Int. Cl.[5] .......... B60K 1/00

[52] U.S. Cl. .......... 180/65.1; 5/81.1; 5/86.1; 5/611; 5/618; 180/271; 180/907; 248/161

[58] Field of Search .......... 180/65.1, 271, 907; 280/250.1, 30; 297/DIG. 4; 414/921, 495, 663, 672; 296/65.1; 248/419, 425, 161, 404; 5/611, 616, 613, 617, 618, 86.1, 81.1

[56] References Cited

U.S. PATENT DOCUMENTS

| | | | |
|---|---|---|---|
| 2,512,160 | 6/1950 | Koenigkiamei et al. | 311/6 |
| 3,936,893 | 2/1976 | Anderson et al. | 5/81 R |
| 4,255,823 | 3/1981 | Boyer et al. | 5/81.1 |
| 4,375,840 | 3/1983 | Campbell | 180/907 |
| 4,407,543 | 10/1983 | Mashuda | 297/DIG. 4 |
| 4,600,239 | 7/1986 | Gerstein et al. | 296/65.1 |
| 4,606,082 | 8/1986 | Kuhlman | 4/561 |
| 4,760,615 | 8/1988 | Furniss | 5/63 |
| 4,761,842 | 8/1988 | Weiner | 5/81 R |
| 4,794,655 | 1/1989 | Ooka et al. | 5/81 R |
| 4,839,933 | 6/1989 | Reewright et al. | 5/81 R |
| 4,939,801 | 7/1990 | Schaal et al. | 5/61 |
| 5,014,688 | 5/1991 | Fast | 128/70 |
| 5,020,815 | 6/1991 | Harris et al. | 280/246 |
| 5,020,818 | 6/1991 | Oxford | 280/250.1 |
| 5,090,513 | 2/1992 | Bussinger | 180/271 |

FOREIGN PATENT DOCUMENTS

| | | | |
|---|---|---|---|
| 1906439 | 8/1970 | Fed. Rep. of Germany | 5/81.1 |
| 2628033 | 12/1977 | Fed. Rep. of Germany | 180/907 |
| 8201313 | 4/1982 | World Int. Prop. O. | 297/DIG. 4 |

OTHER PUBLICATIONS

Sunrise Medical Brochure Concerning 40 Series Wheelcharis.

Catalog Sheets from Magnetic Elektromotoren AG Concerning System 3010 Telescopic Pillars.

Catalog Sheets from THK Company, Ltd., Tokyo, Japan for guides and guide rails.

Catalog sheets from TMK Company, Ltd., Tokyo, Japan for ball screw drives.

Catalog cut sheet from W. W. Grainger, Inc. for Dayton Gear Motors.

*Primary Examiner*—Eric D. Culbreth

*Attorney, Agent, or Firm*—Killworth, Gottman, Hagan & Schaeff

[57] ABSTRACT

A powered transfer and transport system is provided to permit disabled individuals increased mobility and freedom of movement. The powered system performs as a wheelchair in one configuration and as a bed in another, and provides powered mechanisms for variously positioning the seating surface which are operable by the occupant from the seating surface. The powered system includes mechanisms for laterally shifting, elevating, rotating, reclining and driving the seating surface. Enhanced mobility and freedom of movement for the individual results, improving the capability for independent living and expanding employment opportunities.

34 Claims, 6 Drawing Sheets

MOTORIZED TRANSFER AND TRANSPORT SYSTEM FOR THE DISABLED

BACKGROUND OF THE INVENTION

The present invention relates generally to wheelchairs, and more particularly, to a wheelchair having a support structure which provides improved freedom of movement to its occupant.

Various devices are known in the art for assisting, manipulating, transferring and transporting the disabled, and in particular paraplegics. Among the problems experienced by disabled individuals in daily living is the need to transfer from a wheelchair to devices which are higher than the wheelchair, and the need to reach things above the height of their wheelchair or beyond the reach of their outstretched arms. As well, individuals experience other problems related to prolonged sitting in chairs, such as the pooling of blood in lower extremities which causes dizziness.

These problems present obstacles at home and limit employment opportunities. The risk of falling is always present during transfer between a wheelchair and other devices, as is the risk of tipping when reaching upward or outward. The concomitant need for assistance results in higher insurance, medical and living costs, and sometimes causes loss of self-esteem and guilt in disabled individuals.

Numerous clinical devices have been developed to assist in the transfer of patients and disabled individuals. For example, Koenigkramer et al, U.S. Pat. No. 2,512,160, issued Jun. 20, 1950, disclose a patient carriage having a table mounted on balls in a support frame. The balls permit the table to be freely moved side-to-side, forward and backward, and rotated in a limited arc. The table is also capable of being raised vertically by a hydraulic cylinder, and its support frame is mounted on casters. More recently, Ooka et al, U.S. Pat. No. 4,794,655, issued Jan. 3, 1989 and Plewright et al, U.S. Pat. No. 4,839,933, issued Jun. 20, 1989 disclose patient transfer devices having movable table surfaces for transferring patients to adjacent surfaces, as well as means for adjusting those surfaces to place the patient in a supine or reclined position or a sitting position. These patents, as well as Furniss, U.S. Pat. No. 4,760,615, issued Aug. 2, 1988 include means for elevating the table surface. Other patient manipulation devices have been developed in which belts are used to secure an invalid or patient for movement, for example, Weiner, U.S. Pat. No. 4,761,842, issued Aug. 9, 1988.

The drawback of many of these transfer and transport devices is that, as clinical devices, many are not adaptable for home use, often requiring an assistant for operation rather than being user-operable. Some involve prolonged set-up time. Further, many individuals do not like being strapped in devices, where multiple straps are used to retain and secure the occupant.

Other devices for transferring and transporting the disabled from different levels have been developed which are more amenable to use in a home environment. For example, Kuhlman, U.S. Pat. No. 4,606,082, issued Aug. 19, 1986, discloses a chair lift apparatus for lifting and transporting individuals from wheelchairs into a bath or shower. Individuals may transfer from a specially designed wheelchair, whose back may be folded down, into the chair of the chair lift. The chair of the chair lift is suspended from a ceiling-mounted track, and is operable much like a crane by the occupant. The device of this patent, however, is confined in operation to a given path in which tracks are mounted in the ceiling, and thus is both expensive to install and inflexible in its range of use. Further, it is necessary to use a special wheelchair in connection with the chair lift.

Anderson et al, U.S. Pat. No. 3,936,893, issued Feb. 10, 1976, discloses a wheelchair which raises from a normal level to bed level while converting from a chair to a bed. The wheelchair of this patent has the drawback that an assistant is required to convert the device between the chair and bed configurations.

Accordingly, the need continues to exist for devices which provide enhanced mobility and freedom for disabled individuals, and which are operable by the individual, to improve independent living capabilities and employment opportunities, as well as to enhance self-esteem.

SUMMARY OF THE INVENTION

The present invention satisfies the need for a device which provides enhanced mobility and freedom to disabled individuals who are confined to wheelchairs, in particular, paraplegics. The preferred embodiment of the present invention provides, in one wheelchair device, a seating surface which may be laterally shifted side-to-side, raised and lowered, rotated clockwise and counterclockwise, and reclined from a chair configuration to a bed configuration. These features make possible the transfer of a disabled individual between devices of different heights, as well as increasing the ability of an individual to reach up and out, and turn from a single location. The capacity of the present invention to convert to a bed also permits the occupant to avoid dizziness and to recover on an emergency basis from dizziness by immediately adjusting to a supine or prone position. The enhanced mobility of the user makes possible greater independent living, and expands job opportunities, as well as reducing the need for an attendant to assist in various activities. Because of these features which improve the transfer and transport of disabled individuals, the present invention, while performing as a wheelchair in one configuration, will be more broadly referred to as a motorized or powered transfer and transport system.

In accordance with the present invention, a wheeled frame is provided with an accompanying power source, such as two rechargeable 12 volt batteries. A seating surface, preferably having at least three articulating panels, is supported thereon. In the preferred embodiment, the seating surface has a seat panel, having hinged on opposite edges thereof a back panel and a leg panel. Alternately, the leg panel may be two individual leg panels.

The preferred embodiment of the present invention further includes powered means for laterally shifting, elevating, and rotating the seating surface, as well as powered means for reclining the seating surface between the chair configuration and bed configuration, and powered means for driving the wheeled frame.

The powered means for laterally shifting includes one or more rails which extend laterally across the wheeled frame from side-to-side, and one or more guides which slide thereon. Preferably, two generally parallel rails are provided, and two guides are provided for each rail. Further, it is preferred that the rails be arcuate, having a 2 to 5 degree bend, preferably approximately 2 degrees, extending upwards in a generally vertical plane as the rails approach opposite sides of the wheeled frame. The arcuate shape of the rails causes the center of gravity of the occupant of the seating surface to be displaced inward towards the center of the transfer and transport system. The further the seating surface is laterally shifted towards an edge of the wheeled frame, the greater becomes the angle at which the seating surface tilts. Further, for a given position along the rails, the higher the seating surface is elevated, the more inward becomes the center of gravity. Thus, this arcuate shape adds stability to the overall system without significantly effecting the side-to-side motion made possible by the powered means for laterally shifting. The powered means for laterally shifting is driven by an electric motor attached to the power source and a ball screw drive mounted in the wheeled frame.

As is preferred, the powered means for elevating the seating surface includes a telescoping pillar. The telescoping pillar has a first end attached to or riding on the guides, and a second end supporting the seating surface. The second end is extendable in a generally vertical direction to raise and lower the seating surface.

The powered means for rotating preferably includes a first gear rotatably mounted about a generally vertical axis at the second end of the telescoping pillar. The powered means for rotating further includes a gearmotor to drive the first gear, and thereby rotate the seating surface. The seating surface is preferably rotatable at least 180 degrees in both a clockwise and counterclockwise position from a forward facing position, as viewed from above.

The powered means for reclining includes at least one motor to raise and lower the back panel and foot panel and adjust their position or attitude between that of the chair configuration and the bed configuration. Preferably, the lever arms used to adjust the back and foot panels are positioned to extend from supporting framework of the seat panel.

Finally, the powered means for driving the wheeled frame includes one or more motors attached to one or more drive wheels of the wheeled frame. Preferably, two 24 volt drive motors are provided, one for each of two rear wheels, and the motors are operable from a joystick mounted near the seating surface.

Control means for operating the various powered means for laterally shifting, elevating, rotating, reclining and driving, are provided and positioned near the seating surface so as to be operable by the occupant thereof. In the preferred embodiment, the control means is disposed on a foldable or retractable arm of the present invention, as is a plug for recharging the rechargeable batteries used as a source of power, enabling operation by the occupant of the seating surface.

The present invention may further include one or more limit switches connected to the power source to limit the travel of the seating surface in any direction of motion. Thus, limit switches may be used to control lateral motion, the height of elevation, and the degree of rotation of the seating surface, as well as the amount which the back panel is reclined and the foot panel is raised. The limit switches are wired to the power source to cut off power when the desired limit of motion in a given direction is reached.

The control means of the present invention further includes a control circuit which may be switched between a transport mode or position and a transfer mode or position. Either the transport or transfer mode may be chosen, but the control means is designed so that only one mode may be enjoyed while the other is locked out. Thus, when the present invention is operated in the transport mode, the wheeled chassis is driven with the powered means for driving, preferably with a choice between fast and slow speeds. When the present invention is operated in a transfer mode, the seating surface may be laterally shifted, raised, rotated or reclined, to facilitate mobility of the occupant, or transfer from the seating surface to another device. The control means further provides a series of interlocks which prevent operation in the transport mode if the seating surface is laterally shifted off-center, raised in a vertical direction, or rotated from a generally forward facing position.

In a first alternative embodiment, the powered transfer and transport system of the present invention includes the wheeled frame having a power source, and a powered means for laterally shifting the seating surface, where the powered means for laterally shifting includes arcuate tracks.

Similarly, in a second alternative embodiment, the powered transfer and transport system includes the wheeled frame, power source, and powered means for laterally shifting of the first embodiment, as well as powered means for elevating the seating surface.

In a third alternative embodiment, the powered transfer and transport system includes the wheeled frame, power source, and powered means for laterally shifting of the first embodiment, as well as powered means for elevating and powered means for rotating the seating surface.

In a fourth alternative embodiment, the powered transfer and transport system includes the powered means for elevating only, while in a fifth alternative embodiment, only powered means for rotating the seating surface are provided. Other alternative embodiments are envisioned with other combinations of these features.

Accordingly, it is an object of the present invention to provide a powered transfer and transport system for transporting and transferring the disabled wherein a seating surface is provided which may be adjusted side-to-side, raised and lowered, rotated clockwise and counterclockwise, reclined and made upright, and driven. It is a further object of the present invention that the occupant of the seating surface has control of those motions. It is a still further object of the present invention that the control means for operating the powered transfer and transport system includes safety features and interlocks to prevent undesired combinations of transport and transfer functions to thus avoid tipping. It is a yet another object of the present invention that a powered transfer and transport system be provided wherein a wheeled frame includes at least a powered means for laterally adjusting the position of the seating surface thereon, preferably where the powered means for laterally shifting includes shifting along an arcuate path. Similarly, it is an object of the present invention that a powered transfer and transport system be provided wherein a wheeled frame includes at least a powered means for elevating a seating surface or powered means for rotating a seating surface.

These and other objects and features of the present invention will be apparent from the drawings and detailed description which follow.

DETAILED DESCRIPTION OF THE PREFERRED EMBODIMENT

Figure 1:
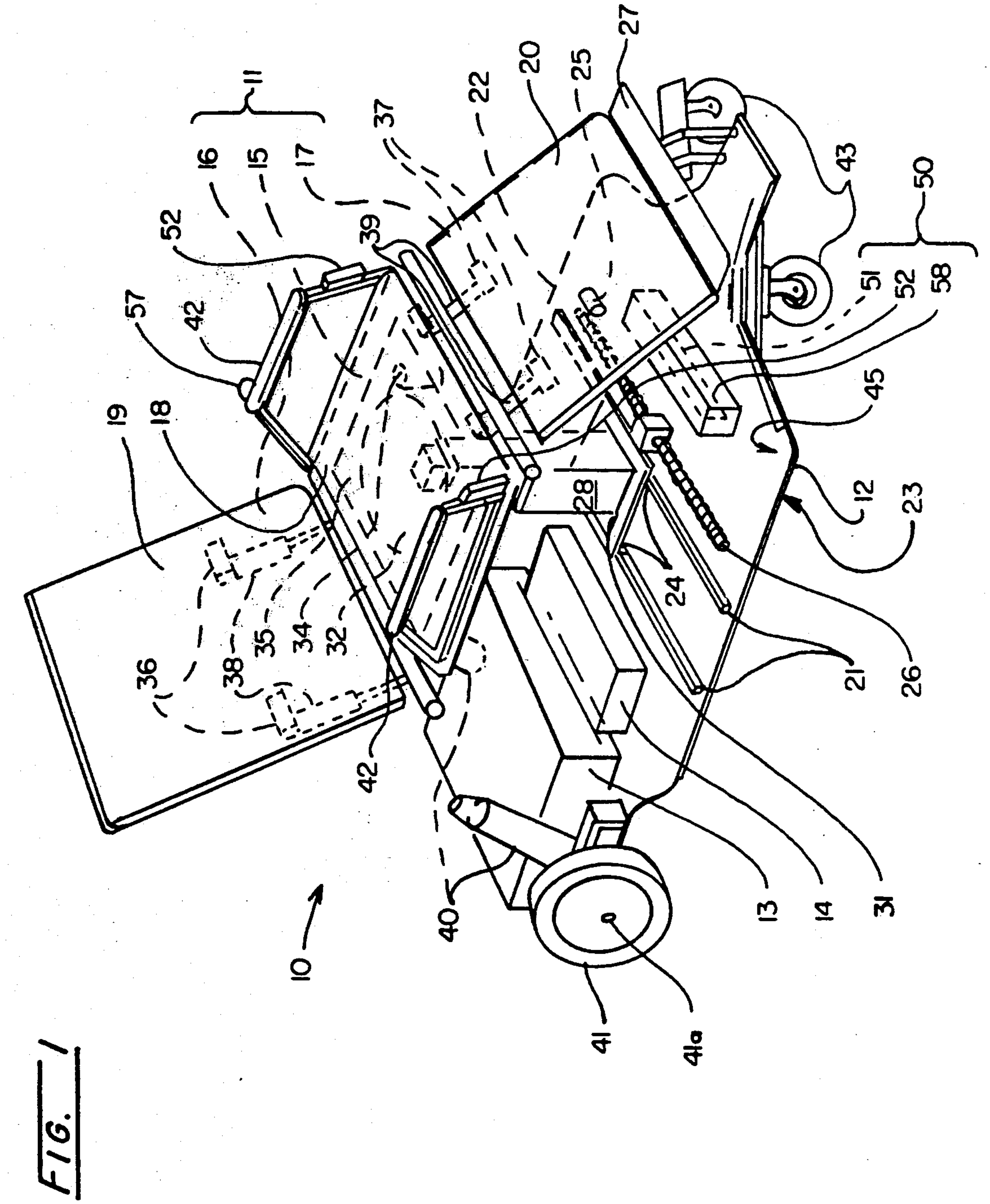
FIG. 1 is a schematic perspective view of the present invention in its preferred embodiment.

Referring to FIG. 1, the preferred embodiment of the powered transfer and transport system, or powered system 10, of the present invention is shown. The powered system 10 provides, in one wheelchair device, a seating surface 11 which may be laterally shifted side-to-side, raised and lowered, rotated clockwise and counterclockwise, and reclined from a chair configuration, further shown in FIG. 2, to a bed configuration, shown in FIG. 3.

Figure 2:
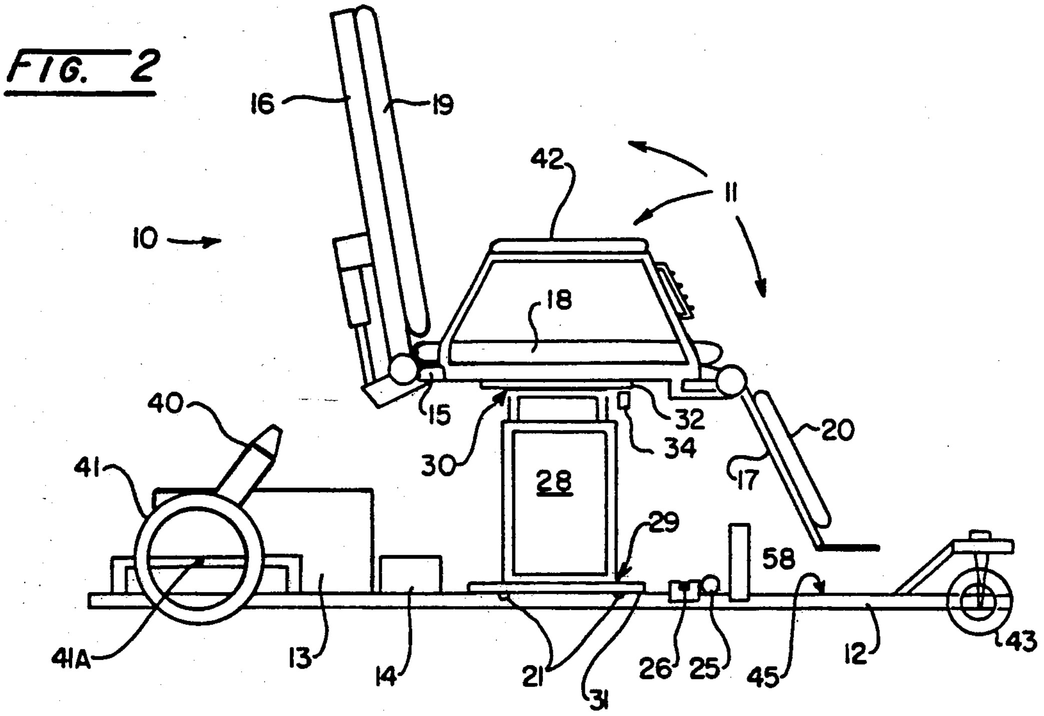
FIG. 2 is a schematic side elevational view of the present invention shown in FIG. 1 in a chair configuration.
Figure 3:
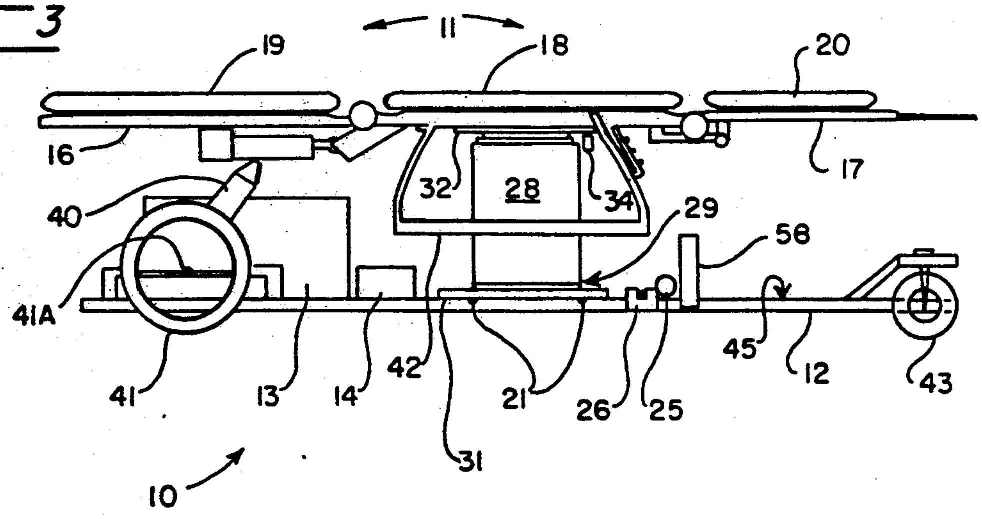
FIG. 3 is a schematic side elevational view of the present invention shown in FIG. 1 in a bed configuration.
Figure 4:
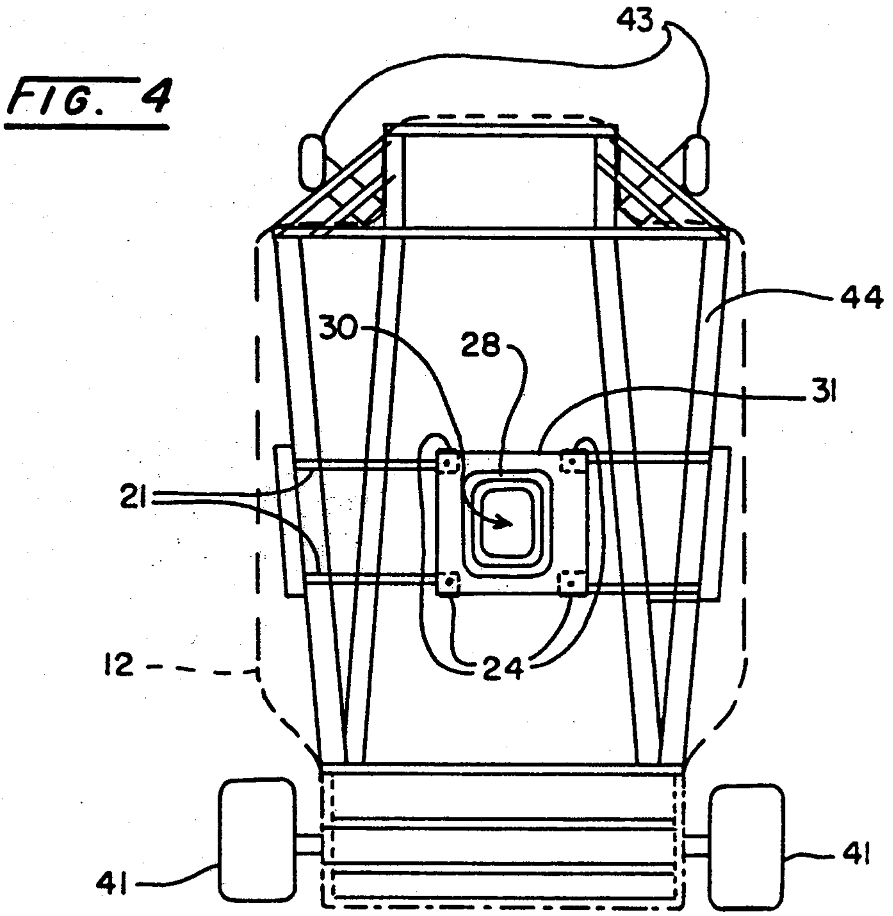
FIG. 4 is a schematic partial plan view of the supporting frame of the present invention.

As shown in FIGS. 1-3, a wheeled frame 12 is provided with an accompanying power source 13, such as two rechargeable 12 volt lead acid batteries, equipped with a recharger 14. Seating surface 11 preferably has at least three articulating panels, seat panel 15, back panel 16 and leg panel 17, and associated seating pads 18, 19 and 20 thereon. In the preferred embodiment shown, the seat panel 15 has the back panel 16 and leg panel 17 hinged thereto along opposite edges. Leg panel 17 further includes foot rest 27, rotatably attached along one edge of leg panel 17 and adapted to be adjustably positioned. Alternately, the leg panel 17 may be two individual leg panels (not shown), separately rotatable and positionable.

The preferred embodiment of powered system 10 further includes powered means for laterally shifting, elevating, and rotating the seating surface 11, as well as powered means for reclining the seating surface 11 between the chair configuration and bed configuration, and powered means for driving the wheeled frame 12.

Figure 6:
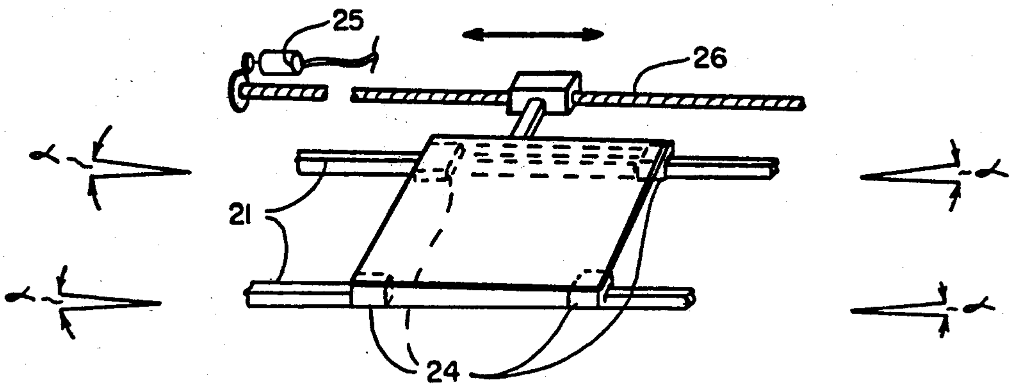
FIG. 6 is a partial schematic perspective view of the powered means for laterally shifting the seating surface of the present invention.

As shown in FIG. 1, and in greater detail in FIG. 6, the powered means for laterally shifting includes one or more rails 21 which extend laterally across the wheeled frame 12 from the left side 22 to the right side 23, and one or more guides 24 which slide on the rails 21. Preferably, two generally parallel rails 21 are provided, and two guides 24 are provided for each rail 21. Such rails and guides are made and commercially available from THK Co., Ltd, Tokyo, Japan. The powered means for laterally shifting provides up to approximately 8 inches of lateral movement from center to each of the left and right sides 22, 23. The amount of lateral shifting may be varied depending on the width of the wheeled frame provided and arrangement of other elements thereon.

Figure 7:
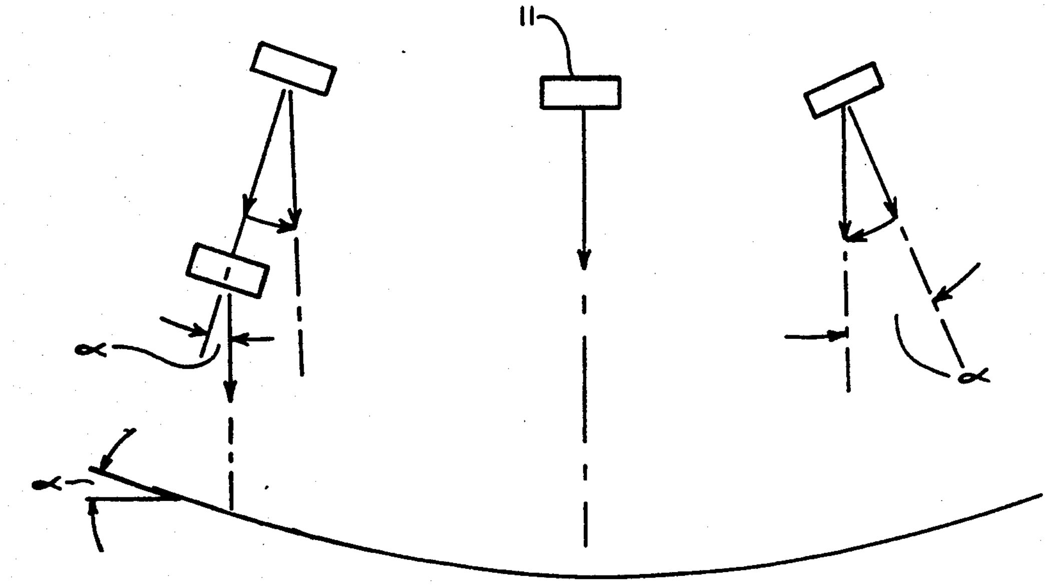
FIG. 7 is a force diagram illustrating the effect of the preferred powered means for laterally shifting the seating surface of the present invention.

Further, as best shown in FIG. 6, it is preferred that the rails 21 be arcuate in shape, formed into a slight arc to have a 2 to 5 degree bend, preferably substantially 2 degrees, as measured at the left and right sides 22, 23 of wheeled frame 12. The arc of rails 21, shown as angle $\alpha$, extends upward in a generally vertical plane as the rails 21 approach the opposite left and right sides 22, 23 of the wheeled frame 12. As illustrated in FIG. 7, the arcuate shape of the rails 21 causes the center of gravity of the occupant of seating surface 11 to be displaced inward towards the center of powered system 10 even as seating surface 11 is laterally shifted towards left or right side 22 or 23 of the wheeled frame 12. Further, for a given position along the rails 21, the higher the seating surface 11 is elevated, the more the center of gravity shifts inward. Thus, the arcuate shape of rails 21 adds stability to the overall powered system 10 without significantly effecting the side-to-side motion of the seating surface 11 made possible by the powered means for laterally shifting. The powered means for laterally shifting is driven by an electric motor 25 attached to the power source 12. Motor 25 rotatably drives a ball screw drive 26 mounted on the wheeled frame 14.

Figure 9A:
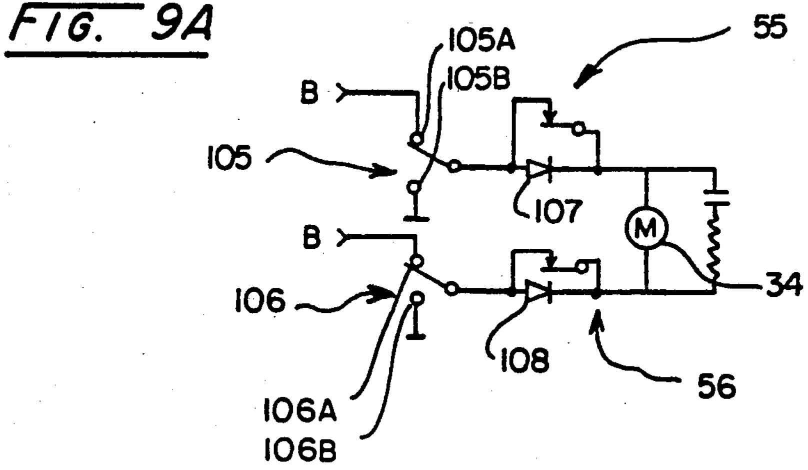
FIGS. 9A, 9B and 9C are schematic electrical diagrams showing the operation of limit switches for laterally shifting, elevating and rotating the seating surface.
Figure 9B:
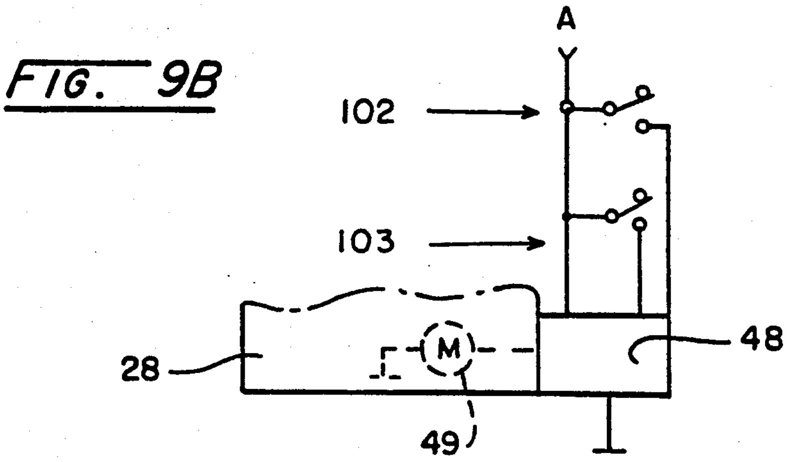

Referring again to FIGS. 1-3, the powered means for elevating the seating surface 11 includes a telescoping pillar 28. As best shown in FIG. 2, telescoping pillar 28 has a first end 29 attached by base plate 31 to guides 24, and has a second end 30 supporting the seating surface 11. While telescoping pillar 28 is shown retracted in FIG. 3, FIGS. 1 and 2 show that the second end 30 is extendable in a generally vertical direction to raise and lower the seating surface 11. Preferably, telescoping pillar 28 raises seating surface 11 to a maximum of generally 2 feet, which provides a margin of safety against tipping. Further, in accordance with the requirements of the present invention, telescoping pillar 28 is designed to support a load of 400 pounds placed one meter away on seating surface 11. Telescoping pillars 28 are available from Magnetic Elektromotoren AG, Liestal, Germany, and Magnetic Corp., Olney, Ill. In the present invention, a modified system 3010, three-action telescoping pillar, model HC8AWDS, adapted for operation with direct current (d.c.) battery power, is preferred. Referring to FIG. 9B, means for driving the telescoping pillar 28 comprises a drive motor 49. A telescoping pillar controller 48 is provided therewith to control the extension and retraction motion of the telescoping pillar 28. Telescoping pillar controller 48 further includes internal limit switches (not shown) to prevent overextension and retraction beyond desired limits.

Figure 5:
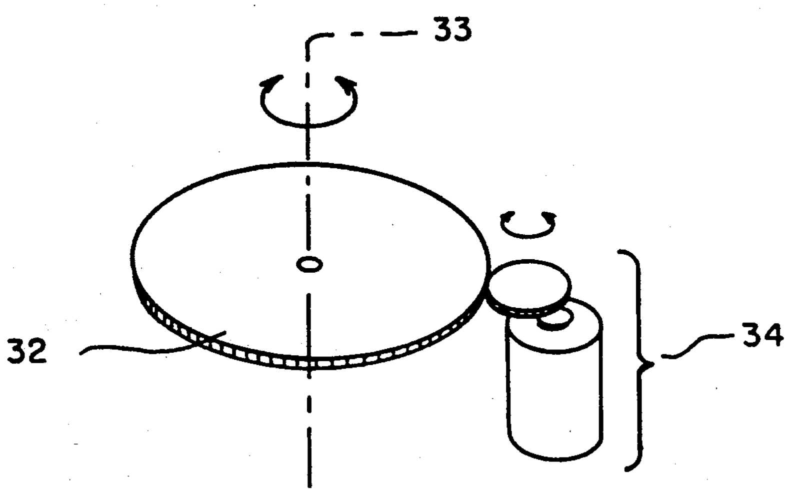
FIG. 5 is a partial schematic perspective view of the powered means for rotating the seating surface of the present invention.

Referring now to FIGS. 1-3 and 5, the powered means for rotating preferably includes a first gear 32, shown best in FIG. 5, rotatably mounted about a generally vertical axis 33 and substantially centered upon the telescoping pillar 28. The powered means for rotating further includes a gearmotor 34 to rotatably drive the first gear 32, and thereby rotate the seating surface 11. Gearmotor 34 may be, for example, a 12 volt Dayton gearmotor, available from W. W. Grainger, Inc. A plate 35 shown in FIG. 1 preferably separates first gear 32 from seating surface 11, and provides a support for mounting gearmotor 34. The seating surface 11 is preferably rotatable at least 180 degrees in both a clockwise and counterclockwise position from a forward facing position, as viewed from above. Rotation is typically limited to 180 degrees in either direction because of wiring connections between control means for operating the powered system 10 and the power source 13. However, unlimited rotation is possible where slip ring connectors (not shown) are used to make such connections.

Referring to FIGS. 1-3, the powered means for reclining includes at least one motor 36, 37 for each of the back panel 16 and foot panel 17, respectively. Preferably, two motors 36, 37 each are used to raise and lower the back and leg panels 16, 17, and may be further used to adjust the position or attitude of back and leg panels 16 and 17, to intermediate positions between that of the chair configuration and the bed configuration. Alternately, air or hydraulic cylinders (not shown) may be used, but direct current (dc) electric motors are preferred. Preferably, the lever arms 38, 39 used to adjust the back and foot panels 16, 17, respectively, are positioned to extend from the supporting framework of the seat panel 15.

Finally, the powered means for driving the wheeled frame 12 includes one or more drive motor/brakes 40 attached to one or more drive wheels 41 of the wheeled frame 12. Preferably, two 24 volt drive motor/brakes 40 are provided, one for each of two drive wheels 41, and are operable from a joystick control 76 mounted near the seating surface 11 on arms 42. A package of drive motor/brakes 40, drive wheels 41 and related joystick control 76 are commercially available from Sunrise Medical, Quickie Designs, Inc., Fresno, Calif., and known as a 40 series wheelchair drive controller. Such a package preferably includes a free-wheel hub device 41*a* which permits disengaging the drive wheels in the event of equipment failures for manual operation. In operation, the joystick control 76 is used to activate one or both motor/brakes 40 to produce motion in the desired direction. The joystick control 76 is incorporated into the control means 50 for operating described in further detail herein.

Referring to FIGS. 1-4, wheeled frame 12 includes two drive wheels 41, preferably rear-mounted, and two front wheels, which are preferably casters 43, capable of rotation and swivel motion. Wheeled frame 12 is preferably made of aluminum, for light weight. Wheeled frame 12 also includes a supporting structure 44, best shown in FIG. 4, and a top deck 45 on which rails 21, power source 13, recharger 14, and other components are mounted.

Referring now to FIGS. 1-3, control means 50 for operating the various powered means for laterally shifting, elevating, rotating, reclining and driving, are provided. Control means 50 includes control circuits 51 shown in greater detail in FIG. 8, and control panels 52. Control panels 52 are positioned near the seating surface 11, preferably on one or both arms 42, to be conveniently operable by the occupant thereof. In the preferred embodiment, the arms 42 are foldable or retractable. Also in the preferred embodiment, a plug 57, shown in FIG. 8, attached to recharger 14 is provided, operable by the occupant of the seating surface 11, to recharge the batteries of power source 13.

Figure 9C:
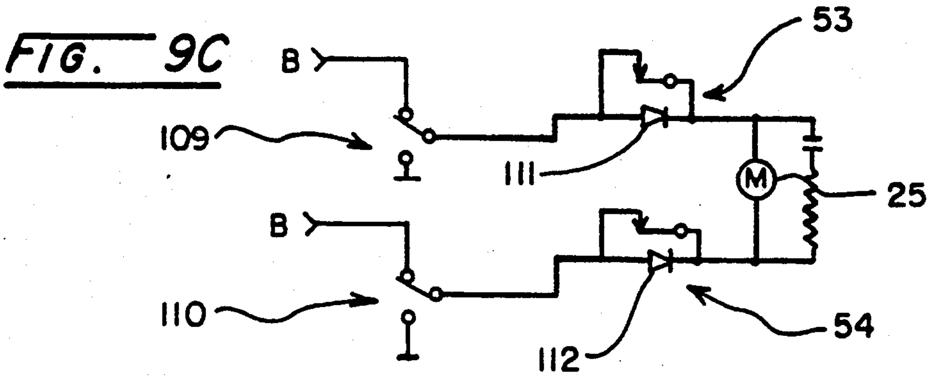

The present invention may further include one or more limit switches connected to the power source 13 to limit the travel of the seating surface 11 in any direction of motion. Thus, as shown in FIGS. 9A-9C, seat shift limit switches 53, 54 seat elevation limit switches which are included in the telescoping pillar 28, and seat rotation limit switches 55, 56 may be used to limit the lateral motion, the height of elevation, and the degree of rotation of the seating surface 11, respectively. As well, the amount which the back panel 16 is reclined and the foot panel 17 are raised may be limited by panel limit switches (not shown). The panel limit switches are wired to the power source 13 to cut off power when the desired limit of motion in a given direction is reached.

Figure 8:
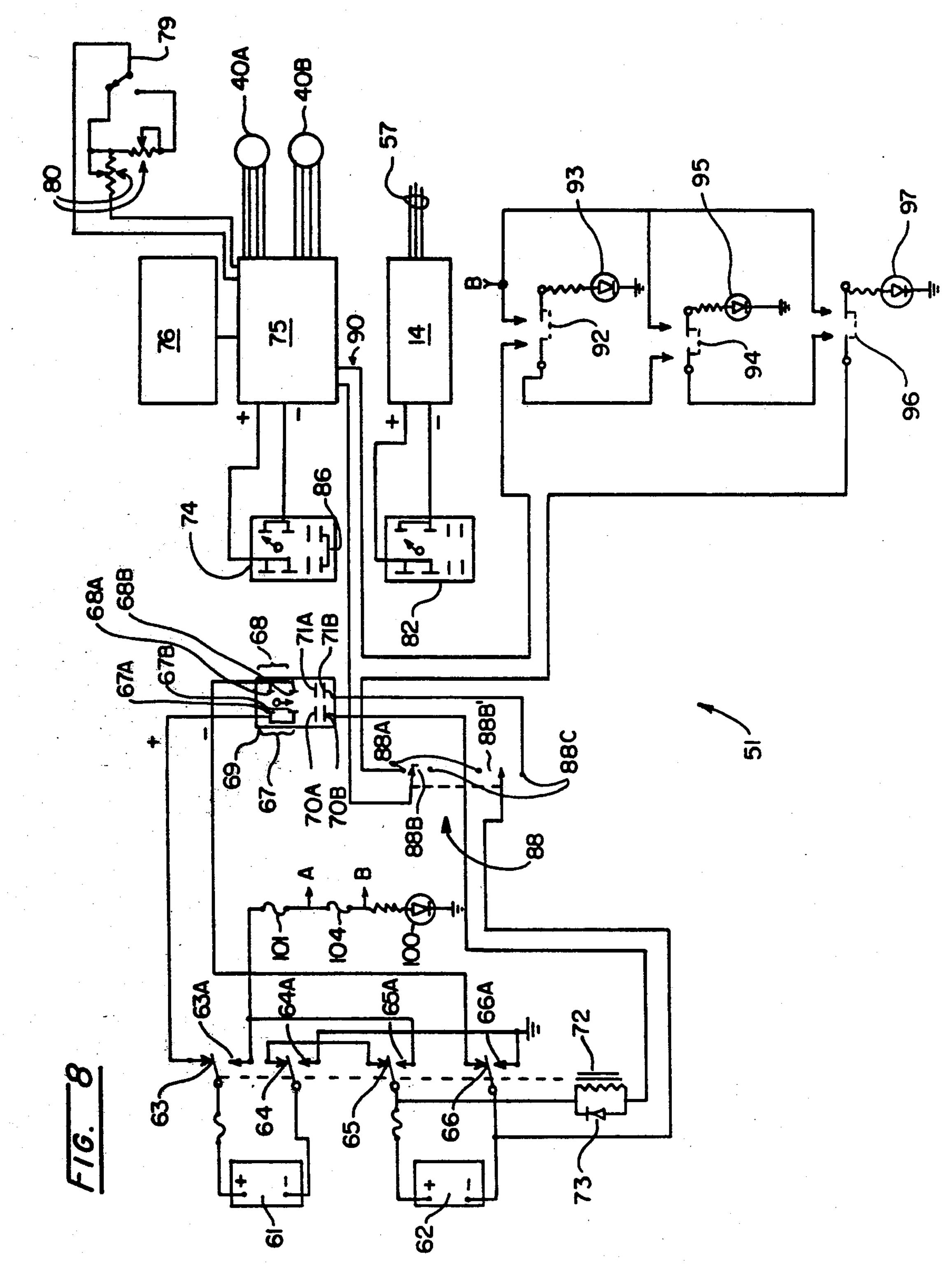
FIG. 8 is a schematic electrical diagram showing the control means for operating the powered means for laterally shifting, elevating, rotating reclining and driving, also showing the operation of interlocks.

The control means 50 for operating the present invention further includes a control circuit 51, shown schematically in FIG. 8, which may be switched between a "transport on" mode or position and a "transfer on" mode or position. Control circuit 51 is preferably disposed in a housing 58 located on wheeled frame 12, as shown in FIGS. 1-3. Either the "transport on" or "transfer on" mode may be chosen, but the control means 50 is designed so that only one mode may be employed at a time while the other is locked out or off. Thus, when the present invention is operated in the "transport on" mode, the wheeled chassis 12 is driven with the powered means for driving, preferably with a choice between fast and slow speeds. Where the present invention is operated in a "transfer on" mode, the seating surface 11 may be laterally shifted, raised, rotated or reclined, to facilitate mobility of the occupant, or to enhance transfer of the occupant from the seating surface 11 to another device. The control means 50 further provides a series of interlocks which prevent operation in the transport mode if the seating surface 11 is laterally shifted substantially off-center, substantially raised in a vertical direction, or substantially rotated from a generally forward facing position. Thus, the seating surface 11 must be substantially centered, lowered, and facing forward before the present invention will operate in the transport mode.

Referring now to FIG. 8, control circuit 51 is shown with power source 13 represented by a pair of 12 volt batteries 61 and 62. Batteries 61 and 62 are connected through normally closed contacts 63, 64, 65 and 66 to vertical blade receptacles 67 and 68 of a female connector 69. The wiring connected to the normally closed contacts 63, 64, 65 and 66 connects the batteries 61 and 62 into series such that 24 volts is provided to the female connector 69. The female connector 69 includes 4 vertically oriented blade receptacles 67*a*, 67*b*, 68*a*, and 68*b* and 4 horizontally oriented blade receptacles 70*a* and 70*b* and 71*a* and 71*b*. The normally closed contacts 63, 64, 65 and 66 are associated with and operated by a relay coil 72 which is shunted by a noise suppression diode 73.

A male connector 74 is connected to a wheelchair drive controller 75 to which a joystick control 76 is connected. The wheelchair drive controller 75 and associated joystick control 76 are purchased as a single element from Sunrise Medical, a division of Quickie Designs, and is a 40 series wheelchair drive controller. The wheelchair drive controller is connected to a left motor/brake 40*a* and a right motor/brake 40*b* which are used to drive left and right rear drive wheels 41 of the wheelchair 10. A fast and slow selection switch 79 is connected to the wheelchair drive controller 75 and a pair of potentiometers 80 which permit adjustment of both the fast and slow speeds of the powered system 10.

A second male connector 82, which is connected to a 24 volt charger, recharger 14, can be connected to the female connector 69 to recharge the 12 volt batteries 61 and 62. Alternately, male connector 74 and second male connector 82 can be plugged together into a single receptacle which is wired so that a selector switch accessible by an occupant on the seat can be used to select the connector to be activated or "plugged into" female connector 69.

When the wheelchair drive controller 75 is connected to the batteries 61 and 62 by inserting the male connector 74 into the female connector 69, a jumper 86 connects the two lower horizontal blades 70*b* and 71*b* for operation of the transfer devices of the wheelchair 10. A ganged bank switch 88 permits the user of the powered system 10 to select a "transport on" position 88*a*, a neutral or off position 88*b*, and a "transfer on" position 88*c* of the switch 88 for performing corresponding operations with the powered system 10. In the "transport on" position, 88*a*, with the connectors 74 and 69 intermated, the powered system 10 is provided with 24 volt power. Further, in the "transport on" position, 88*a*, a series of interlock connections must be made to provide power at 90 through the upper bank of the switch, shown as 88*a*. These interlock connections are contacts of the centered detection switch 92, elevation detection switch 94 and rotation detection switch 96.

The interlocks function as a safeguard against movement of the wheelchair if the seating surface 11 is shifted off center, extended upward, or rotated. The purpose of the interlocks is to enhance the safety and security of the user by preventing tipping, and consequent injury. Thus, if the seating surface 11 is not substantially centered, but shifted to the left or right of center, the left contact of the center detection switch 92 will be open such that the wheelchair drive controller 75 is turned off. If seating surface 11 is substantially centered, the left contact is closed, and the right contact of the center detection switch 92 will also close and activate a centered indicating light emitting diode (LED) 93 to indicate that the seating surface 11 is substantially centered on the wheeled frame 12. Similarly, if telescoping pillar 28 is not substantially fully retracted, but extended, the left contact of the elevation detection switch 94 will be open so that the wheelchair drive controller 75 is turned off. Once telescoping pillar 28 is substantially fully retracted, the contacts of the elevation detection switch will close and activate a retraction indicating light emitting diode (LED) 95 to indicate that seating surface 11 is substantially retracted. Finally, if seating surface 11 is rotated clockwise or counterclockwise from a substantially forward facing position, the left contact of the rotation detection switch 96 will be open so that the wheelchair drive controller 75 is turned off. Once seating surface 11 is substantially in a forward facing position, the left contact will close and the right contact of the rotation detection switch will also close and activate rotation indicating light emitting diode (LED) 97 to indicate that the seating surface 11 is forward facing. With the wheelchair drive controller 75 thus turned on, a person using the wheelchair can operate the joystick control 76 to control the left and right motor/brakes 40*a* and 40*b* and thereby move the wheelchair.

Since it is not desirable to simultaneously operate the wheelchair in both a "transport on" and a "transfer on" mode, activation of switch 88 to the "transfer on" position, 88*c*, activates only the powered means for laterally shifting, rotating, elevating, and reclining, while locking out the wheelchair drive controller 75 required for transport. In the "transfer on" position, the relay coil 72 is activated through both the jumper 86 and the 12 volt battery 62 such that the normally opened contacts 63*a*, 64*a*, 65*a*, and 66*a* are closed, thereby connecting the 12 volt batteries 61 and 62 in parallel between ground potential and a "transfer on" light emitting diode 100.

Referring to FIGS. 8 and 9B, the 12 volt power from batteries 61 and 62 is provided through a 15 amp fuse 101 at point A shown in FIG. 8, to power the telescoping pillar 28 via raise and lower switches 102 and 103, as shown in FIG. 9B. Referring to FIG. 9B, it is noted that the telescoping pillar 28 receives power from point A is indicated. Telescoping pillar 28 has internal limit switches (not shown) in telescoping pillar controller 48 which signal its fully elevated and fully retracted positions, and serve as seat elevation limit switches.

Referring to FIGS. 8, 9A and 9C, 12 volt power is also provided through a 3 amp fuse 104 at point B shown in FIG. 8, to power the powered means for rotating and the powered means for laterally shifting the seating surface 11, shown in FIGS. 9A and 9C, respectively. Since both of the systems are substantially identical only the rotation circuitry in FIG. 9A will be described. The gearmotor 34 for rotating the seating surface 11 is connected to the 12 volt B supply via a rotate clockwise switch 105 and a rotate counterclockwise switch 106. Connected between the gearmotor 34 and the switches 105 and 106 are clockwise and counterclockwise seat rotation limit switches 55 and 56, respectively. The clockwise seat rotation limit switch 55 and diode 107 associated therewith are connected in parallel with each other, and connected in series between the rotate clockwise switch 105 and one side of the gearmotor 34. Similarly, the counterclockwise seat rotation limit switch 56 and the diode 108 associated therewith are connected in parallel with each other, and then connected in series between the rotate counterclockwise switch 106 and the other side of the gearmotor 34. Preferably rotate clockwise switch 105 and rotate counterclockwise switch 106 are spring biased to be normally closed in positions 105*a* and 106*a*, respectively, and thus, connected to the power source at B.

Assuming that seating surface 11 is initially substantially centered, in a neutral position, operation of the system to cause rotation occurs as follows. With reference to FIG. 9A, to produce clockwise rotation, the rotate clockwise switch 105 is switched to ground position 105*b*, and the switch 106 is positioned in its normal position 106*a*. Current thus flows from the 12 volt power supply at B through the switch 106, diode 108 and counterclockwise seat rotation limit switch 56, gearmotor 34, and through the clockwise seat rotation limit switch 55 to the switch 105, which is connected to ground. This causes the seating surface 11 to rotate in the clockwise direction. Releasing the rotate clockwise switch 105 at any point during rotation will allow it to return to its initial, normal position, 105*a*, connecting to the power source 13 at B. If clockwise rotation is continued uninterrupted, clockwise seat rotation limit switch 55 will ultimately be activated, opening the current path to the gearmotor 34 at the clockwise seat rotation limit switch 55, and stopping clockwise rotation.

To produce counterclockwise rotation, the rotate clockwise switch 105 is released to return to its initial, normal position 105*a* in contact with the power source 13 at B. The rotate counterclockwise switch 106 is then moved to ground position 106*b*. Assuming seating surface 11 has been rotated to its maximum limit, and the clockwise seat rotation limit switch 108 is now open, power from the power source 13 at B flows through the switch 105, diode 120, gearmotor 34, counterclockwise seat rotation limit switch 56, and to ground via the rotate counterclockwise switch 106. The seating surface 11 thus begins rotating in a counterclockwise direction. Almost immediately the clockwise seat rotation limit switch 55 will be deactivated and close, allowing current to flow through both the clockwise limit switch 55 and the diode 107 for continuing counterclockwise rotation. Again, if counterclockwise rotation continues to the point that the counterclockwise seat rotation limit switch 56 is activated, current flow to the gearmotor 34 is interrupted and further counterclockwise rotation of the seating surface 11 will stop.

Again, as shown in FIG. 9C, operation of the powered means for laterally shifting through shift right switch 109 and shift left switch 110, in cooperation with seat shift limit switches 53, 54 and associated diodes 111 and 112, respectively, occurs in like fashion as with the powered means for rotating, to shift the seating surface 11 left and right on wheeled frame 12.

It is to be understood that the materials of the present invention, and means for connecting the components of the present invention are conventional and as known in the art, unless otherwise indicated.

Alternative embodiments of the present invention are provided where the powered system of the present invention includes fewer than all of the powered means for laterally shifting, elevating, rotating, reclining and driving the seating surface 11. However, in each case, other aspects and features of the present invention remain.

Thus, in a first alternative embodiment, the present invention includes the wheeled frame 12 having a power source 13, and only the powered means for laterally shifting the seating surface 11, where the powered means for laterally shifting includes arcuate tracks 21.

In a second alternative embodiment, the powered system 10 of the first alternative embodiment further includes powered means for elevating the seating surface 11, and in a third alternative embodiment, the powered system 10 of the first alternative embodiment further includes powered means for elevating and powered means for rotating the seating surface 11.

In a fourth alternative embodiment, the powered system 10 includes the powered means for elevating seating surface 11 only, while a fifth alternative embodiment includes only the powered means for rotating the seating surface 11. It is to be understood that other alternative embodiments are further contemplated with other combinations of these features.

Thus, while certain representative embodiments and details have been shown for purposes of illustrating the invention, it will be apparent to those skilled in the art that various changes in the apparatus disclosed herein may be made without departing from the scope of the invention, which is defined in the appended claims.

What is claimed is:

1. A powered transfer and transport system for the disabled, said powered system comprising:

a wheeled frame;

a power source comprising one or more rechargeable batteries disposed on said wheeled frame;

a seating surface comprising one or more panels supported by said wheeled frame;

one or more arms disposed on at least one side of said seating surface;

powered means for laterally shifting said seating surface, said powered means for laterally shifting disposed on said wheeled frame and connected to said power source;

powered means for elevating said seating surface, said powered means for elevating disposed on said frame and connected to said power source;

powered means for rotating said seating surface, said powered means for rotating disposed on said means for elevating and connected to said power source;

control means for operating said powered means for laterally shifting, said powered means for elevating, and said powered means for rotating, said control means disposed on said frame and operable from said seating surface; and means for recharging said rechargeable batteries, said means for recharging operable from said seating surface.

2. A powered system as recited in claim 1, further comprising powered means for driving said wheeled frame; and wherein said control means for operating is further adapted to operate said powered means for driving.

3. A powered system as recited in claim 2 wherein said wheeled frame comprises:

a frame structure of light weight material having three or more wheels rotatably mounted thereon; and one or more of said wheels is rotatably driven by said powered means for driving.

4. A powered system as recited in claim 2 wherein said powered means for driving said wheeled frame comprises one or more drive motors.

5. A powered system as recited in claim 2 wherein said control means comprises:

a control circuit which may be switched between a transport position, and a transfer position;

wherein said transport position activates only said powered means for driving said wheeled frame; and wherein said transfer position activates only said powered means for laterally shifting, said powered means for elevating, and said powered means for rotating.

6. A powered system as recited in claim 5 wherein said control means further comprises:

a chair shifting interlock comprising a first interlock switch having a first, closed position when said chair is substantially centered on said wheeled frame, and a second, open position when said chair is substantially off-center on said wheeled frame;

a chair elevation interlock comprising a second interlock switch having a first, closed position when said chair is substantially lowered on said wheeled frame, and a second, open position when said chair is substantially raised on said wheeled frame; and a chair rotation interlock comprising a third interlock switch having a first, closed position when said chair faces substantially forward, and a second, open position when said chair is substantially rotated from facing forward;

said first, second and third interlock switches connected in said control circuit to disconnect said powered means for driving said wheeled frame from said power source, where said control circuit is switched to said transport position, and where one or more of said first, second and third interlock switches is in a second, open position.

7. A powered system as recited in claim 1, further comprising powered means for reclining at least portions of said seating surface; and wherein said control means for operating is further adapted to operate said powered means for reclining.

8. A powered system as recited in claim 7 wherein:

said seating surface comprises a seat panel, a back panel rotatably connected to a first edge of said back panel, and a leg panel rotatably connected to a second edge of said back panel; and said powered means for reclining comprises means for changing the attitude of at least one of said back panel and said leg panel, said means for changing the attitude including one or more seating surface drive motors attached to at least one of said back panel and said leg panel, said back panel and said leg panel adjustable to positions varying between a chair configuration and a bed configuration.

9. A powered system as recited in claim 1 wherein said powered means for laterally shifting comprises one or more rails disposed on and extending generally laterally across said wheeled frame;

one or more guides slidably disposed on said one, or more rails and attached to said means for elevating said seating surface; and means for driving said one or more guides along said one or more rails;

whereby said seating surface may be adjusted laterally towards either edge of said wheeled frame by an occupant thereof.

10. A powered system as recited in claim 1 wherein said powered means for laterally shifting shifts said seating surface laterally in one or more directions along an arcuate path.

11. A powered system as recited in claim 1 wherein said powered means for elevating comprises:

a telescoping pillar having a first end attached to said powered means for laterally shifting, and having a second end, extendable in a generally vertical direction and attached to one or more panels of said seating surface; and means for driving said telescoping pillar to extend and retract said second end;

whereby said seating surface may be raised and lowered by an occupant thereof.

12. A powered system as recited in claim 1 wherein said powered means for rotating rotates said seating surface at least substantially 360 degrees from a first end of a rotational arc to second end of said rotational arc, said powered means for rotating disposed on said powered means for elevating and attached to said seating surface.

13. A powered system as recited in claim 10 wherein said powered means for rotating comprises:

a first gear, rotatably mounted about a generally vertical axis on said powered means for elevating, said first gear further attached to one or more panels of said seating surface; and drive means for rotatably driving said first gear about said generally vertical axis.

14. A powered system as recited in claim 1 wherein said power source comprises one or more rechargeable batteries.

15. A powered system as recited in claim 1 further comprising one or more arms disposed on at least one side of said seating surface;

said one or more arms being foldable to a first position for use and a second position for storage;

at least one of said one or more arms attached to said control means for operating said powered means for laterally shifting, said powered means for elevating and said powered means for rotating.

16. A powered system as recited in claim 1 further comprising one or more limit switches connected to said power source to limit the travel of said seating surface in at least one direction of motion.

17. A powered system as recited in claim 1 wherein said wheeled frame comprises a frame structure of light weight material having three or more wheels rotatably mounted thereon.

18. A powered system as recited in claim 1 wherein said means for recharging is operable from at least one of said one or more arms.

19. A powered transfer and transport system for the disabled, said powered system comprising:

a wheeled frame;

a power source disposed on said wheeled frame;

a seating surface comprising one or more panels supported by said wheeled frame;

powered means for laterally shifting said seating surface, said powered means for laterally shifting disposed on said wheeled frame and connected to said power source, wherein:

said powered means for laterally shifting shifts said seating surface laterally in one or more directions along an arcuate path; and said powered means for laterally shifting includes:

one or more rails disposed on and extending generally laterally across said wheeled frame, said one or more rails having an arcuate shape disposed in a generally vertical plane;

one or more guides slidably disposed on said one or more rails and attached to means for elevating said seating surface; and means for driving said one or more guides along said one or more rails, such that said seating surface may be adjusted laterally along an arcuate path by an occupant thereof;

powered means for elevating said seating surface, said powered means for elevating disposed on said frame and connected to said power source;

powered means for rotating said seating surface, said powered means for rotating disposed on said means for elevating and connected to said power source; and control means for operating said powered means for laterally shifting, said powered means for elevating, and said powered means for rotating, said control means disposed on said frame and operable from said seating surface.

20. A powered transfer and transport system for the disabled, said powered system comprising:

a wheeled frame;

a powered source disposed on said wheeled frame comprising one or more rechargeable batteries;

a seating surface comprising one or more panels supported by said wheeled frame;

one or more arms disposed on at least one side of said seating surface;

powered means for laterally shifting said seating surface, said powered means for laterally shifting disposed on said wheeled frame and connected to said power source;

powered means for elevating said seating surface, said powered means for elevating disposed on said frame and connected to said power source;

powered means for rotating said seating surface, said powered means for rotating disposed on said frame and connected to said power source;

control means for operating said powered means for laterally shifting, said powered means for elevating, and said powered means for rotating, said control means disposed on said frame and operable from said seating surface; and means for recharging said rechargeable batteries, said means for recharging operable from at least one of said one or more arms.

21. A powered transfer and transport system for the disabled, said powered system comprising:

a wheeled frame;

a power source disposed on said wheeled frame;

a seating surface comprising one or more panels supported by said wheeled frame;

powered means for laterally shifting said seating surface, said powered means for laterally shifting disposed on said wheeled frame and connected to said power source;

powered means for elevating said seating surface, said powered means for elevating disposed on said frame and connected to said power source;

powered means for rotating said seating surface, said powered means for elevation disposed on said frame and connected to said power source;

control means for operating said powered means for laterally shifting, said powered means for elevating, and said powered means for rotating, said control means disposed on said frame and operable from said seating surface, one or more limit switches connected to said power source to limit the travel of said seating surface in at least one direction of motion, wherein said one or more limit switches include:

left and right chair shifting limit switches positioned on said frame to contact said powered means for laterally shifting at opposing lateral edges of said wheeled frame;

raised and lowered chair elevation limit switches positioned to contact said powered means for elevating when said powered means for elevating is extended to its maximum length, and retracted to its shortest length; and clockwise and counterclockwise chair rotation limit switches positioned on said frame to contact said means for rotating when said means for rotating has rotated substantially 180 degrees from a forward facing position in either a clockwise direction or counterclockwise position, respectively, as viewed from above.

22. A powered transfer and transport system for the disabled, said powered system comprising:

a wheeled frame;

a power source disposed on said wheeled frame;

a seating surface comprising one or more panels supported by said wheeled frame;

powered means for laterally shifting said seating surface on said wheeled frame connected to said power source, said powered means for laterally shifting operable to shift said seating surface laterally in one or more directions along an arcuate path which extends in a generally vertical direction from said wheeled frame; and control means for operating said powered means for laterally shifting from said seating surface.

23. A powered system as recited in claim 22 wherein said powered means for laterally shifting shifts said seating surface from approximately 0 inches to approximately 8 inches in at least one direction from a substantially central position on said wheeled frame.

24. A powered system as recited in claim 22 further comprising:

powered means for elevating said seating surface, said powered means for elevating disposed on said wheeled frame; and control means for operating said powered means for elevating from said seating surface.

25. A powered system as recited in claim 24 wherein said powered means for elevating comprises:

a telescoping pillar having a first end attached to said powered means for laterally shifting, and having a second end, extendable in a vertical direction and attached to one or more panels of said seating surface; and means for driving said telescoping pillar to extend and retract said second end;

whereby said seating surface may be raised and lowered by an occupant thereof.

26. A powered system as recited in claim 24 further comprising:

powered means for rotating said seating surface, said powered means for rotating disposed on said powered means for elevating and further attached to said seating surface; and control means for operating said powered means for rotating from said seating surface.

27. A powered system as recited in claim 22 further comprising:

powered means for rotating said seating surface supported by said powered means for laterally shifting and further attached to said seating surface; and control means for operating said powered means for rotating from said seating surface.

28. A powered system as recited in claim 27 wherein said powered means for rotating comprises:

a first gear, rotatably mounted about a generally vertical axis on said powered means for laterally shifting for rotation of at least substantially 360 degrees from a first end of a rotational arc to a second end of said rotational arc, said first gear attached to one or more panels of said seating surface; and drive means for rotatably driving said first gear about said generally vertical axis;

whereby said seating surface may be rotated up to at least substantially 180 degrees from a central position by the occupant thereof.

29. A powered system as recited in claim 22 further comprising one or more limit switches connected to said power source to limit the travel of said seating surface in at least one direction of motion.

30. A powered system as recited in claim 22 wherein said power source comprises one or more rechargeable batteries, and said powered system further comprises means for recharging said rechargeable batteries operable from said seating surface.

31. A powered system as recited in claim 30 further comprising:

one or more arms disposed on at least one side of said seating surface; and wherein said means for recharging is operable from at least one of said one or more arms.

32. A powered transfer and transport system for the disabled, said powered system comprising:

a wheeled frame;

a power source disposed on said wheeled frame;

a seating surface comprising one or more panels supported by said wheeled frame;

powered means for laterally shifting said seating surface on said wheeled frame connected to said power source, said powered means for laterally shifting operable to shift said seating surface laterally in one or more directions along an arcuate path, and said powered means for laterally shifting including:

one or more rails disposed on and extending generally laterally across said wheeled frame, said one or more rails having an arcuate shape disposed in a generally vertical plane;

one or more guides slidably disposed on said one or more rails and attached to one or more panels of said seating surface; and means for driving said one or more guides along said one or more rails; and control means for operating said powered means for laterally shifting from said seating surface;

whereby said seating surface may be adjusted laterally in either direction along an arcuate path by an occupant thereof.

33. A powered system as recited in claim 32 wherein said means for driving said one or more guides comprises a ball screw drive.

34. A powered transfer and transport system for the disabled, said powered system comprising:

a wheeled frame;

a power source disposed on said wheeled frame;

a seating surface comprising one or more panels supported by said wheeled frame;

powered means for laterally shifting said seating surface on said wheeled frame connected to said power source, said powered means for laterally shifting operable to shift said seating surface laterally in one or more directions along an arcuate path, where said arcuate path extends in a generally vertical plane and tilts said seating surface up to approximately 5 degrees from vertical at each end of said arcuate path; and control means for operating said powered means for laterally shifting from said seating surface.

* * * * *

UNITED STATES PATENT AND TRADEMARK OFFICE

CERTIFICATE OF CORRECTION

PATENT NO. : 5,193,633

DATED : March 16, 1993

INVENTOR(S) : Bertram N. Ezenwa

It is certified that error appears in the above-identified patent and that said Letters Patent is hereby corrected as shown below:

Column 15, line 29, "for elevation disposed" should be --for rotating disposed--.

Signed and Sealed this

Eleventh Day of January, 1994

Attest:

BRUCE LEHMAN

Attesting Officer

Commissioner of Patents and Trademarks